United States Patent Office 3,496,225
Patented Feb. 17, 1970

3,496,225
PROCESS FOR CONVERTING HIGH MOLECULAR WEIGHT ALKYL-SUBSTITUTED SULTONES TO ALKENE SULFONATES USING SUBSTANTIALLY ANHYDROUS CONDITIONS
Ted J. Logan, Colerain Township, Hamilton County, and Harold H. Beyer, Springfield Township, Hamilton County, Ohio, assignors to The Procter & Gamble Company, Cincinnati, Ohio, a corporation of Ohio
No Drawing. Filed Dec. 30, 1966, Ser. No. 605,972
Int. Cl. C07c $143/16$
U.S. Cl. 260—513      8 Claims

ABSTRACT OF THE DISCLOSURE

Process for converting high molecular weight alkyl-substituted sultones to alkene sulfonates which comprises reacting such sultones with an anhydrous base at 120° C.–200° C. for from about 5 minutes to about 4 hours.

BACKGROUND OF THE INVENTION

Field of the invention

This invention pertains to the field of olefin sulfonation reaction products such as sultones or sultone-containing sulfonation acid mixes and their conversion to alkene sulfonates.

Description of prior art

Sultones are intramolecular esters of hydroxy sulfonic acids. They are present as ingredients, for example, in sulfonation reaction products prepared by reacting sulfur trioxide with alpha olefin hydrocarbons. Hydrolysis of the sultones results in their conversion to alkene sulfonates and hydroxysulfonates. Both acid hydrolysis and alkaline hydrolysis procedures have been described in the prior art. Formation of hydroxysulfonates appears to be favored by the presence of hydroxyl ions during the step when the cyclic sultone ring is cleaved. Reactions of the foregoing type are described and illustrated in the following: United States Patents 3,127,442 dated Mar. 31, 1964 and 3,164,609 dated Jan. 5, 1965; French Patent 1,403,447 published May 10, 1965; Netherlands patent application 6504298, published Oct. 11, 1965; Netherlands patent application 6408570, published Feb. 1, 1965; Netherlands patent application 6409378, published Feb. 16, 1965; Netherlands patent application 6407958, published Jan. 25, 1965; Belgium Patent 663,228, dated Apr. 29, 1965; German Patent 1,185,178, dated Jan. 14, 1965; and German Patent 1,214,671, dated Apr. 21, 1966.

SUMMARY OF THE INVENTION

It has now been discovered that high molecular weight alkyl-substituted sultones can be converted to alkene sulfonates by a simple, highly efficient process which comprises reacting high molecular weight alkyl-substituted sultones with an anhydrous base at a temperature in the range of from about 120° C. to about 200° C. for a time period in the range of from about 5 minutes to about 4 hours, under substantially anhydrous conditions. The preferred temperature range is about 135° C. to about 190° C. and the preferred reaction time is from about 10 minutes to about 3 hours.

The sultone compounds contemplated by the present invention have the following formula

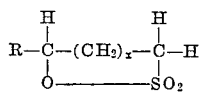

wherein R is an alkyl group containing from about 7 to about 24 carbon atoms and in which $x$ is 1 or 2. R, the alkyl substituent, can be straight chain or branched chain. It can be substituted or unsubstituted.

Illustrative examples of sultone compounds suitable for use in this invention include:

3-hydroxydecane-1-sulfonic acid sultone
4-hydroxydecane-1-sulfonic acid sultone
3-hydroxyundecane-1-sulfonic acid sultone
4-hydroxyundecane-1-sulfonic acid sultone
3-hydroxydodecane-1-sulfonic acid sultone
4-hydroxydodecane-1-sulfonic acid sultone
3-hydroxytridecane-1-sulfonic acid sultone
4-hydroxytridecane-1-sulfonic acid sultone
3-hydroxytetradecane-1-sulfonic acid sultone
4-hydroxytetradecane-1-sulfonic acid sultone
3-hydroxypentadecane-1-sulfonic acid sultone
4-hydroxypentadecane-1-sulfonic acid sultone
3-hydroxyhexadecane-1-sulfonic acid sultone
4-hydroxyhexadecane-1-sulfonic acid sultone
3-hydroxyheptadecane-1-sulfonic acid sultone
4-hydroxyheptadecane-1-sulfonic acid sultone
3-hydroxyoctadecane-1-sulfonic acid sultone
4-hydroxyoctadecane-1-sulfonic acid sultone
3-hydroxynonadecane-1-sulfonic acid sultone
4-hydroxynonadecane-1-sulfonic acid sultone
3-hydroxyeicosane-1-sulfonic acid sultone
4-hydroxyeicosane-1-sulfonic acid sultone
3-hydroxyheneicosane-1-sulfonic acid sultone
4-hydroxyheneicosane-1-sulfonic acid sultone
3-hydroxydocosane-1-sulfonic acid sultone
4-hydroxydocosane-1-sulfonic acid sultone
3-hydroxytricosane-1-sulfonic acid sultone
4-hydroxytricosane-1-sulfonic acid sultone
3-hydroxytetracosane-1-sulfonic acid sultone
4-hydroxytetracosane-1-sulfonic acid sultone It will be seen from the above formula and the listed compounds that the sultones are all gamma and delta sultones. The 3-hydroxy compounds correspond to gamma-sultones and the 4-hydroxy compounds correspond to delta-sultones. The nomenclature is interchangeable. In the description and examples below, the gamma and delta terminology is used. Higher isomeric sultones e.g., epsilon sultones, are similarly converted to alkene sulfonates by the present invention.

Moreover, it is essential that the alkyl substituent be in the carbon range prescribed. If R is methyl or ethyl or up to about 5 carbons, for example, the resulting sultone could tend to serve as a polar solvent and thereby interfere with the desired sultone conversion. Preferably, R should contain from about 9 to about 20 carbon atoms.

Sultones are solids at ordinary room temperatures and, as described below, require the use of somewhat elevated temperatures.

The anhydrous bases which can be used in the present invention are any alkali or alkaline earth compounds which give a basic solution, i.e., a pH above 7, in water. These compounds are typically solids at room temperature. Examples include alkali and alkaline earth hydroxides, alkoxides containing up to 6 carbon atoms, cyanides, phosphates, carbonates, silicates, pyrophosphates, carboxylates, phenolates, and borates.

Specific examples are sodium, potassium, and lithium hydroxides, calcium hydroxide, sodium methoxide, calcium methoxide, sodium cyanide, potassium cyanide, sodium triphosphate, sodium tripolyphosphate, sodium phosphate, sodium metaphosphate, sodium borate, sodium acetate, potassium acetate, lithium acetate, calcium acetate, sodium phenoxide, tetrapotassium pyrophosphate, sodium tripolyphosphate, sodium nitrilotriacetate, sodium polymaleate, sodium polyitaconate, potassium polymaleate, potassium polyitaconate, sodium and potassium salts of ethane - 1 - hydroxy - 1,1 - diphosphonic acid, and the like.

The strength of the anhydrous base has a bearing upon the reaction temperatures employed. Sodium hydroxide, potassium hydroxide, and sodium, potassium, and calcium methoxides, for example, are relatively strong bases and they give the desired sultone ring opening reaction at temperatures of 140° C.–145° C. Because of these relatively mild temperatures, stronger bases are preferred.

Another reason for preferring the stronger bases such as those just mentioned over relatively weaker bases such as sodium and potassium cyanides is the absence of a toxic reaction by-product. Sodium and potassium cyanides being relatively weak bases require higher reaction temperatures on the order of 185–190° C. with both gamma and delta sultones. Gaseous hydrogen cyanide is a by-product from using sodium and potassium cyanide and appropriate precautions must be taken to insure that this higher toxic gas does not escape into the laboratory. This can be accomplished by scrubbing the exit gas with an aqueous sodium hydroxide solution in order to neutralize the hydrogen cyanide. This procedure offers the advantage that the progress of the reaction can be followed by titration of aliquots from the sodium hydroxide scrubbing vessel.

Regardless of which anhydrous alkaline compounds are used, the reaction temperature should be in the range of from about 120° C. to about 200° C. and preferably from about 135° C. to about 190° C. Temperatures in excess of about 200° C. can be used, if necessary, to accelerate a sluggish reaction rate. As a matter of practical convenience, however, temperatures above 200° C. are not usually found necessary.

By the same token, if reaction temperatures below 120° C. are used, the reaction will either not proceed at all or will be too slow to be of practical value.

At the reaction temperatures mentioned above, the normally solid sultones melt and are liquids. However, during the reaction with the anhydrous alkaline bases, the liquid sultones are converted to solid sulfonate products, making stirring and intimate contact of the reactants quite difficult, especially in the latter stages of the reaction. For this reason, i.e., in order to facilitate mixing the reactants to provide good contact and an efficient complete reaction, it is preferred to operate the process using an excess of the sultone starting material. Generally, the process is performed using an excess of sultone of from about .5% to about 15% over the stoichiometric amount, and preferably from about 2% to about 12% excess. This excess presents no problems in product isolation since the reaction product can simply be triturated with petroleum ether to recover the unchanged excess sultone. A further advantage of using excess sultone, besides the added ease of stirring the reactants, is that it consumes all of the anhydrous base, which would otherwise be quite difficult to remove from the final desired alkene sulfonate product. The reaction can be run using about stoichiometric amounts of the sultone and the anhydrous base but employing an excess of the sultone is a preferred procedure.

An illustration of the desirability of using an excess of the sultone is octadecane-delta sultone (4-hydroxyoctadecane-1-sulfonic acid sultone) which is a solid, M.P. 65° C. At elevated reaction temperature, the molten sultone provides fluidity to the mixture. An excess of about 10% greatly facilitates stirring and reactant contact, especially in the latter stages of the reaction.

As an alternative embodiment towards solving the problem of adequate contact between the sultone reactant and the anhydrous alkaline base, it has been discovered that a non-polar solvent can be added to the reaction mixture. Mineral oil, for example, has been found to be very satisfactory and is preferred. It has been found that mineral oil not only facilitates stirring and reactant contact, but also decreases the foaming tendency caused by the evolution of such by-products as methyl alcohol and hydrogen cyanide vapors, among others. The mineral oil is easily removed by trituration of the reaction product mixture with petroleum ether. This embodiment of providing fluidity to the reaction mixture is preferred over the use of excess sultone. Thus, when a non-polar reaction media is employed as a preferred embodiment, the reactants can be present in stoichiometric amounts.

Besides mineral oil, other similar non-polar materials can be used such as ordinary paraffin, liquid high-boiling aromatic hydrocarbons, alkylbenzenes, and silicone oils.

It is critical that highly polar solvents be avoided in order to provide maximum amounts of alkene sulfonates. In a polar solvent such as dimethylformamide, for instance, sodium cyanide reacts with octadecane delta-sultone at about 95° C.–100° C. to give a sodium-4-cyanooctadecyl sulfonate. As a consequence, in such an excellent nucleophilic displacement solvent, no alkene sulfonates are formed.

Solvents having polarities intermediate between mineral oil and dimethylformamide give mixtures of displacement products and alkene sulfonate products. Examples of such solvents are trichloromethane, acetone, ethyl ether, lower alcohols such as methyl and ethyl alcohols, tetrachloromethane, benzyl chloride and esters such as ethyl acetate.

It has been discovered according to the present invention that the reaction should be performed under substantially anhydrous conditions. The presence of water even in small amounts is detrimental and prevents the attainment of maximum conversion of sultones to alkene sulfonates. The preferred anhydrous bases are those such as trisodium phosphate and the sodium and potassium methoxides which do not form water of neutralization. Sodium hydroxide and sodium carbonate tend to form water of neutralization when reacted with either sultones or alkene sulfonic acids in the following manner:

$$Na_2CO_3: H^+ + Na_2CO_3 \rightarrow Na^+ + NaHCO_3$$

$$H^+ + NaHCO_3 \rightarrow H_2O + CO_2 + Na^+$$

$$NaOH: H^+ + NaOH^+ \rightarrow H_2O + Na^+$$

The reaction time is in the range of from about 5 minutes to about 4 hours and preferably from about 10 minutes to about 3 hours. Longer or shorter reaction times can be used but optimum conversion results are obtained by practicing the invention within these reaction times.

While the present invention is not fully understood, it is believed that the reaction between the high molecular weight alkyl-substituted gamma and delta sultones and the anhydrous base is an E–2 elimination wherein the base abstracts a proton from a carbon adjacent to the carbon bearing the oxygen function, followed by an electron shift which breaks the carbon-oxygen linkage. This can be illustrated in terms of a gamma-sultone and a methoxide anhydrous base in the following manner

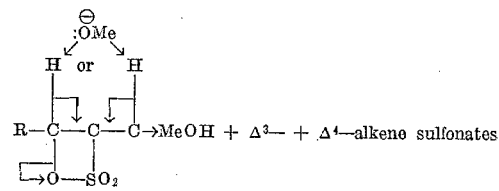

There is a 2:1 preference for exocyclid:endocyclic proton removal from the gamma sultone. This is thought to be due to inherent strain in the gamma-sultone ring. Removal of the endocyclic proton may create additional strain in the transition state, thus favoring isocyclic proton removal.

Delta sultones on the other hand are substantially more stable and have little inherent strain. If the endocyclic proton removal creates additional strain in the transition state, it may not be a factor in determining which proton is lost, as in the gamma sultone case. Also, with the delta-sultone, the bulk of the alkyl group may make it easier for removal of the endocyclic proton, favoring formation of a $\Delta^3$-olefin sulfonate.

In any event, by this invention the gamma and delta sultones are converted to alkene sulfonates which are predominantly the 3- and 4-alkene sulfonates, the exact amounts of each depending upon the starting sultone raw material.

An extremely valuable advantage of this invention and, therefore, a preferred embodiment of the invention is its application to a sulfonation reaction product (hereinafter at times referred to as an "acid mix") obtained by reacting sulfur trioxide and an alpha olefin. Such reactions are well known and generally involve diluted and undiluted sulfur trioxide gas and so-called detergent range liquid alpha olefins, e.g., containing from about 10 to about 26 carbon atoms. The reaction techniques vary widely and include batch or continuous processes employing back mix reactors, film sulfonators and the like. As a practical matter, the sulfonation acid mix so obtained is generally comprised of isomeric alkene sulfonic acids, gamma and delta sultones, and minor amounts of disulfonate species which have resulted from the reaction of sulfur trioxide and the alkene sulfonic acids. It has unexpectedly been found that by applying the present invention to a sultone-containing sulfonic acid mix, it is possible to convert the gamma and delta sultones to alkene sulfonates. By this manner, the amount of alkene sulfonates in the final product is maximized and the amount of hydroxysulfonate species ordinarily formed can be minimized. As a result of this invention, it is now possible to control the final product composition of a detergent composition prepared from a sulfonated acid mix and end up with essentially an alkene sulfonate detergent. Alkene sulfonates are known to be excellent detergents whose sudsing properties differ from hydroxysulfonates in built and unbuilt detergent systems. Heretofore, it has not been possible to so accurately control the alkene sulfonate content by a simple straightforward process as that described herein and illustrated in detail hereinafter.

Each of the reaction conditions specified above in terms of a sultone-anhydrous base reaction also applies to a sulfonation acid mix-anhydrous base reaction. The reaction temperatures, proportions, times and the like should be adhered to.

According to this preferred embodiment, an acid mix consisting essentially of isomeric alkene sulfonic acids, gamma and delta sultones, and minor amounts (less than 15%) of disulfonate species which have resulted from the reaction of sulfur trioxide with the alkene sulfonic acids is neutralized under anhydrous conditions (except for any water formed by neutralization of the alkene sulfonic acids) and the mixture obtained is heated to a temperature in the range of from about 120° C. to about 200° C., preferably 135° C.–190° C., for a period ranging from about 5 minutes to about 4 hours, preferably about 10 minutes to about 3 hours. The sultones in the acid mix, instead of being converted primarily to hydroxysulfonates, are converted to alkene sulfonates.

The process is carried out by adding the acid mix to a charge of an anhydrous alkaline base, preferably an anhydrous alkaline powder, and mixing vigorously. The mixing can be performed by any satisfactory manner such as a conventional ribbon blender, or any mixer providing twin blade kneading action. Generally any mixer designed to handle and mix pasty doughlike materials can be used. The sequence can be reversed and the anhydrous alkaline powder can be added to the acid mix.

After the liquid acid mix is added to the anhydrous alkaline base powder, the mixture in the mixer which has a pasty, doughlike consistency is heated to the prescribed reaction temperature. Just as previously described, it is thought that the sultones present in the acid mix are cleaved, and in the absence of added water, form primarily alkene sulfonates.

In this embodiment, the preferred anhydrous alkaline base is trisodium phosphate, TSP, although each of the others mentioned above can also be used with good results. Maximum conversion is obtained using this base powder due, it is thought, to the fact that no water of neutralization is formed when TSP is reacted with either sultone or alkene sulfonic acid.

The anhydrous alkaline base in this embodiment serves not only the purpose of cleaving the sultone ring and thereby converting the sultones to alkene sulfonates but also of neutralizing the sulfonic acid species already in the acid mix. The ratio of the anhydrous alkaline powder to the acid mix can vary widely, therefore, but in any event it should be adequate to insure the preparation of a fully neutralized alkene sulfonate product. With alkaline bases such as sodium tripolyphosphate, trisodium phosphate, and the like, the proportion can generously exceed stoichiometric amounts since the excess of such materials can remain in the alkene sulfonated product and serve as detergency aids, e.g., builders. As a broad range, the proportion of the anhydrous alkaline base powder and the sultone should be about 1.0 to about 10.0 moles of anhydrous base per each mole of $SO_3$ reacted in the acid mix. A preferred range within which the present invention should be practiced is 1.1 to about 6.0 moles of anhydrous base per each mole of $SO_3$ reacted in the acid mix.

This embodiment of the present invention represents a valuable advance in the art of converting detergent range sulfonation acid mixes to predominantly alkene sulfonate detergents. A primary point of novelty is that it can be characterized as an anhydrous or "dry" neutralization. The dry alkaline base powder requires the use of very vigorous mixing with the liquid acid mix. Vigorous mixing is essential to insure adequate contact between the solid alkaline powder and the acid mix. As the reaction proceeds, the need for vigorous mixing increases because, as mentioned earlier, the acid mix is thereby converted to a solid alkene sulfonate product.

Whereas typical neutralization and hydrolysis processes of sulfonation acid mixes result in compositions containing alkene sulfonates and hydroxysulfonates in a proportion of about 2:1 by weight, the present invention provides an improvement in which that proportion is in the range of about 6:1 to about 15:1, alkene sulfonates to hydroxysulfonates. These results are illustrated in Examples VIII and XV in which a typical acid mix is treated according to the procedures described herein.

The present invention is illustrated, but not limited, by the following examples.

EXAMPLE I

Three and twenty-five hundredths grams (0.05 mole) of KCN was mixed with 18.3 g. (0.055 mole) of octadecane delta sultone and ground in a mortar and pestle to insure good mixing. This mixture was then heated to 185–190° C. for approximately 20 minutes in a 3-necked flask equipped with thermometer, stirrer, and drying tube. During this period, a reaction was evident as shown by frothing caused by the evolution of a gas (HCN). The product mixture was cooled and extracted with petroleum ether to give 2.3 g. of unreacted octadecane delta sultone (12.3%) and 16.9 g. of a white crystalline solid that contained no cyano groups by infrared analysis. This latter solid was dissolved in 800 ml. of hot 95% EtOH, filtered, and then cooled to give 9.45 g. (51%) of crystalline product. Further cooling gave an additional crystal crop of 1.6 g., for a total yield of 60% of purified product.

*Analysis.*—Calcd. for octadecene sulfonates (potassium salt) $C_{18}H_{35}SO_3K$: C, 58.4; H, 9.46; S, 8.65; HIV, 68.6. Found: C, 58.2; H, 9.7; S, 8.5; HIV, 62.4 (91%).

Oxidative cleavage of this sample to ascertain double bond positions gave the following results: $\Delta^1$, 0.8%; $\Delta^2$, 11.4%; $\Delta^3$, 48.0%; $\Delta^4$, 30.6%; $\Delta^5$, 7.7%; $\Delta^6$, 1.3%; and $\Delta^7$, 0.2%.

EXAMPLE II

Into a 3-necked, 250 ml. flask equipped as in Example I was placed 3.25 g. (0.05 mole) of KCN and 18.3 g. (0.055 mole) of octadecane gamma sultone. This mixture was heated from 130 to 171° C. over a period of 20 minutes, while stirring was continued, then extracted with a 1:1 solution of petroleum ether:diethyl ether. (The use of the ether co-solvent is helpful since the gamma sultones are poorly soluble in pure petroleum ether.) This gave a 3.6% recovery of sultone over the excess employed and left 18.5 g. of crude olefin sulfonate product which contained no cyano groups by infrared analysis. This was dissolved in 500 ml. of hot 90% iso-propyl alcohol and allowed to stand at room temperature overnight. Filtratin gave 12.6 g. (70%) of product in the first crop and an additional 1.95 g. (total yield, 80.8%) when the liquors were cooled to 10° C.

*Analysis.*—Calcd. for octadecene sulfonates (potassium salt) $C_{18}H_{35}SO_3K$: C, 58.4; H, 9.46; S, 8.65; HIV, 68.6. Found: C, 58.1; H, 9.6; S, 8.2; HIV, 68.9 (100.3%).

Oxidative cleavage indicated the double bond positions as shown below: $\Delta^1$, 0.8; $\Delta^2$, 25.4; $\Delta^3$, 33.0; $\Delta^4$, 21.4; $\Delta^5$, 13.7; $\Delta^6$, 4.4; and $\Delta^7$, 1.3.

EXAMPLE III

Following the procedure in Example I, 13.8 g. (0.05 mole) of tetradecane delta sultone and 3.25 g. (0.05 mole) of KCN were thoroughly mixed in the dry state, mixed with 50 ml. of light mineral oil, and held at 183–197° C. for 1.5 hr. Petroleum ether extraction gave 54.35 g. of mineral oil containing tetradecane delta sultone (by infrared) and 15.1 g. of crude tetradecene sulfonate product which was not further characterized except to note that it contained no cyano group by infrared.

EXAMPLE IV

In the equipment described in Example I, 18.3 g. (0.055 mole) of octadecane gamma sultone and 0.05 mole of sodium methoxide were mixed with 31.0 ml. of mineral oil and heated while being stirred well from 116° to 157° C. over a period of 30 min. As evidenced by the foaming (MeOH evolution) the reaction started at 143° C. and the reactants reached a maximum temperature at 157° C. in 3 min. before falling back to 144° C. over a 15 min. period. Petroleum ether extraction showed that 82% of the sultone had reacted. By infrared, the sultone remaining in the mineral oil was unchanged. The 13.8 g. of crude, petroleum-insoluble solid, which contained no ether bands in the infrared, was dissolved in 500 ml. of 90% isopropanol, filtered, and allowed to crystallize. Two crystal crops gave a total of 9.4 g. of alkene sulfonates, 58% yield.

*Analysis.*—Calcd. for octadecene sulfonates (sodium salt) $C_{18}H_{35}SO_3Na$: C, 58.9; H, 9.5; S, 9.8; HIV, 77.9. Found: C, 58.7; H, 9.8; S, 9.7; HIV, 71.1 (91.3%).

Oxidative cleavage indicated the following double bond positions (106% recovery): $\Delta^1$, 0.7; $\Delta^2$, 0.3; $\Delta^3$, 96.4; $\Delta^4$, 1.6; $\Delta^5$, 0.4; $\Delta^6$, 0.6.

Roman analysis indicated the percent trans double bonds was $85\pm15\%$ and the cis was 0–25%. Actually, no cis-band was observed, but overlap of the cis and trans-bands made it difficult to positively state that the cis-band was completely absent.

EXAMPLE V

In a similar experiment to Example IV were mixed 2.7 g. (0.05 mole) of sodium methoxide, 16.7 g. (0.055 mole) of hexadecane gamma sultone, and 27.3 g. (31.0 ml.) of mineral oil. This particular sultone contained 2.5% hydroxy sulfonic acid as an impurity, as shown by an HV determination. The mixture was stirred and heated at 150°–170° C. for 2.5 hours. Petroleum ether extraction gave 29.2 g. of soluble material and 15.0 g. of insoluble product which contained no ether band in the infrared. Dissolving this solid in 500 ml. of hot isopropanol and recrystallization gave 5.45 g. of product in the first crystal crop.

*Analysis.*—Calcd. for hexadecene sulfonates (sodium salt) $C_{16}H_{31}SO_3Na$: C, 58.9; H, 9.5; S, 9.8; HIV, 77.9; HV, 163. Found: C, 57.6; H, 9.8; S, 9.5; HIV, 57.2 (73.4%); HV, 26 (16%).

Oxidative cleavage gave the following analysis (79% recovery): $\Delta^1$, 1.0%; $\Delta^2$, 31.5%; $\Delta^3$, 64.2%; $\Delta^4$, 1.9%; $\Delta^5$, 1.4%.

EXAMPLE VI

Calcium methoxide was prepared by refluxing 1.0 g. of Ca metal in 30 ml. of MeOH for 6 hrs. in a 500 ml., 3-necked flask. Mineral oil, 31.0 ml., was added and the suspension heated to 100° C. for 10 min. under a nitrogen stream to remove the methanol. Then, 18.3 g. of octadecane gamma sultone was added and the temperature held at 155–168° C. for 2.5 hrs. The mixture was continuously stirred. Extraction with petroleum ether-ether gave 33.3 g. of extract which contained 4.3 g. of unchanged gamma sultone (by infrared). The air dried solid, which was free of ether and hydroxyl absorption in the infrared and weighed 14.95 g. (85.2%). It was dissolved in 500 ml. of isopropanol and 70 ml. of water, filtered, and crystallized at room temperature to give 3.35 g. of product, 23% yield. Additional crystal crops were not taken.

*Analysis.*—Calcd. for octadecene sulfonates (calcium salts) $C_{36}H_{70}S_2O_6Ca$: S, 61.5; H, 9.97; S, 9.11; Ca, 5.7; HIV, 72.3. Found: C, 61.6; H, 10.1; S, 8.8; Ca, 5.2; HIV, 72.2.

The double bond position analysis (121% recovery) showed: $\Delta^1$, 0.9; $\Delta^2$, 2.5; $\Delta^3$, 58.0; $\Delta^4$, 29.0; $\Delta^5$, 6.7; $\Delta^6$, 1.7; $\Delta^7$, 0.8; $\Delta^8$, 0.4.

The $C_{14}$ Ca salt was prepared in an identical manner.

EXAMPLE VII

In a mortar and pestle were ground 2.0 g. (0.05 mole) of sodium hydroxide and 18.3 g. (0.05 mole) of octadecane gamma sultone. This mixture was placed in a flask immersed in an oil bath and heated to 140° C. At this point, an exothermic reaction raised the temperature to 160° C. and some frothing was obvious. A temperature between 140° and 160° was maintained for 30 minutes and during this time it was obvious that water drops were collecting in the upper part of the apparatus. Stirring was continuous during the reaction. Petroleum ether extraction gave 4.2 g. (23%) of sultone and left 14.2 g. of crude solid (theoretical yield 13.6 g.). Recrystallization from 800 ml. of hot 90% isopropnaol gave 5.35 g. (39.5%) of crystals. An additional 2.6 g. (total yield 59%) was recovered at 15° C.

*Analysis.*—Calcd. for octadecene sulfonate (sodium salt) $C_{18}H_{35}SO_3Na$: C, 61.0; H, 9.89; S, 9.04; HIV, 71.7. Found: C, 59.0; H, 10.2; S, 8.5; HIV, 59.8 (83.5%).

As illustrated in the previous examples, the present invention can be used effectively in converting substantially pure high molecular weight sultone compounds to alkene sulfonic acids. The other valuable embodiment of this invention is its application to the treatment of acid mixes obtained by sulfonating olefins with diluted or undiluted sulfur trioxide in batch sulfonation processes or continuous back-mix or film sulfonation processes. Normally such acid mixes contain in the range of about 25% to about 50% sultone compounds. Such acid mixes are described for example, in copending patent applications Ser. No. 561,352, filed June 29, 1966, by A. Kessler and P. F. Pflaumer; Ser. No. 561,397, filed June 29, 1966, by A. Kessler and P. F. Pflaumer; and Case 1065, Ser. No. 514,468, filed Dec. 17, 1965, by C. W. Motl and H. Beyer.

These copending patent applications also describe the conversion of such acid mixes to detergent compositions employing novel aqueous neutralization techniques. The eventual products obtained from such processes are detergent compositions which contain relatively high amounts of hydroxy sulfonic acids, e.g., from about 20% to about 70% by weight. A typical composition obtained by such aqueous neutralization processes contains alkene sulfonates and hydroxysulfonates in a proportion of about 2:1 by weight. For many detergent applications such compositions are preeminently satisfactory since the compositions are excellent cleaning and sudsing agents. By the same token, the sudsing characteristics of such detergent compositions do not meet all cleaning requirements. For some applications, detergent compositions are desired which provide a different suds profile, e.g., which provide fewer or greater suds than normal.

It has now been discovered that this result can be achieved by detergent compositions containing proportionately smaller amounts of hydroxysulfonates. In this respect, the present invention is valuable when used to treat normal olefin sulfonation acid mixes since the sultone compounds are converted to alkene sulfonates and thereby the proportionate amount of hydroxysulfonates is held to a minimum. Moreover, by carefully applying and controlling the present invention in treating olefin sulfonation acid mixes it is possible to prepare an olefin sulfonate detergent composition having tailor-made sudsing properties by controlling the relative amounts of alkenesulfonates and hydroxysulfonates. This embodiment of the present invention is illustrated by the following examples in Table I.

In the following examples, typical sulfonation acid mixes were prepared by reacting alpha olefins such as decene ($C_{10}$), dodecene ($C_{12}$), hexadecene ($C_{16}$), octadecene ($C_{18}$), and eicosene ($C_{20}$), with air-diluted sulfur trioxide using a film sulfonation reaction technique of the type described generally in the previously mentioned copending patent application Ser. No. 514,468, filed Dec. 17, 1965.

The acid mixes, therefore, in the following examples comprised essentially about 50% alkene sulfonic acids, about 40% gamma and delta sultones, and about 10% disulfonated species. The free acids, sultones and the disulfonated species contained the number of carbons contained in the starting alpha olefin.

As mentioned previously in Examples I–VII, the anhydrous alkaline conditions involved either excess sultones or a non-polar solvent such as mineral oil. In the examples below, a dry neutralization is involved inasmuch as the alkaline reactant was present as a solid powder.

Thus, the acid mix was dry neutralized by adding the acid mix to an anhydrous powder in a suitable mixing device. The semi-fluid material obtained was heated to an elevated temperature for a specified length of time. During the heating step, the high molecular weight gamma and delta sutone constituent of the acid mix was converted primarily to alkene sulfonate and the physical form of the material changed from a semi-fluid to a semi-solid state.

While the exact nature of the dry neutralization reaction is not understood, it is believed that during the heating step, the gamma and delta sultones originally present in the acid mix are cleaved and, in the absence of water, form primarily alkene sulfonates.

In the following examples, trisodium phosphate (TSP) was the dry alkaline powder which was used. Results obtained with TSP are merely representative. Equally satisfactory results can be obtained by using any of the anhydrous alkaline materials mentioned above. The special advantage of using TSP which makes this a preferred embodiment of the dry neutralization process described herein is that any excess TSP used in making the detergent product is present in the final composition to serve as a builder ingredient. The same advantage is also apparent in using the other alkaline materials, but TSP is especially valuable in this respect.

TABLE I.—EXAMPLES OF DRY NEUTRALIZATION OF TYPICAL SULFONATION ACID MIXES USING ANHYDROUS TRISODIUM PHOSPHATE

|  | Ex. VIII—$C_{10}$ Neutralization | | Ex. IX—$C_{12}$ Neutralization | | Ex. X—$C_{18}$ Neutralization | | Ex. XI—$C_{20}$ Neutralization | |
|---|---|---|---|---|---|---|---|---|
|  | Normal | Dry | Normal | Dry | Normal | Dry | Normal | Dry |
| Percent Alkene Sulfonate [1] | 63.1 | 79.5 | 66.6 | 84.3 | 66.0 | 86.5 | 66.4 | 86.5 |
| Percent Hydroxy Sulfonate [2] | 27.8 | 11.1 | 27.7 | 10.3 | 31.1 | 11.3 | 36.1 | 14.7 |
| Ratio, alkene/hydroxy | 2.3 | 7.2 | 2.4 | 8.2 | 2.1 | 7.7 | 1.8 | 5.9 |
| Neutralizing Agent | [3] NaOH | [4] TSP | NaOH | TSP | NaOH | TSP | NaOH | TSP |
| Molar Ratio: Neutralizing Agent/$SO_3$ in Acid Mix | 1 | 1.14 | 1 | 1.14 | 1 | 1.11 | 1 | 1.13 |
| Heating Time | 10 min. | 1.5 hrs. | 10 min. | 2 hrs. | 10 min. | 1 hr. | 10 min. | 1 hr. |
| Heating Temperature, °C | 116 | 138 | 166 | 129 | 166 | 143 | 166 | 141 |
| Effective Completeness, percent [5] |  | 94.2 |  | 91.8 |  | 94.1 |  | 97.0 |

|  | Ex. XII—$C_{16}$ Neutralization, Dry | Ex. XIII—$C_{16}$ Neutralization, Dry | Ex. XIV—$C_{16}$ Neutralization, Dry | Ex. XV—$C_{16}$ Neutralization, Dry |
|---|---|---|---|---|
| Percent Alkene Sulfonate [1] | 90.5 | 87.5 | 85.0 | 85.6 |
| Percent Hydroxy Sulfonate [2] | 6.1 | 8.0 | 11.7 | 13.2 |
| Ratio, alkene/hydroxy | 14.8 | 10.9 | 7.3 | 6.5 |
| Neutralizing Agent | TSP | TSP | TSP | TSP |
| Molar Ratio: Neutralizing Agent/$SO_3$ in Acid Mix | 1.13 | 1.13 | 1.13 | 1.13 |
| Heating Time | 1 hr. | 1 hr. | 30 min. | 1 hr. |
| Heating Temperature, °C | 166 | 166 | 166 | 166 |
| Effective Completeness, percent [5] | 98.5 | 96.0 | 97.5 | 96 |

[1] Calculated from Bromate-Bromide I.V.
[2] Calculated from acid-catalyzed hydroxyl value for sulfonation acid mix.
[3] 30% Aqueous Solution.
[4] Trisodium Phosphate.
[5] Conversion of sultone as determined by petroleum ether extraction.

The foregoing description of the invention has been presented describing certain operable and preferred embodiments. It is not intended that the invention should be so limited since variations and modifications thereof will be obvious to those skilled in the art, all of which are within the spirit and scope of this invention.

What is claimed is:

1. A process for converting high molecular weight alkyl-subsituted sultones to alkene sulfonates which comprises reacting (a) an alkyl-substituted sultone having the formula

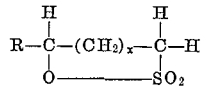

wherein R is an alkyl group containing from 7 to about 24 carbon atoms, and $x$ is 1 or 2, and (b) an anhydrous base selected from the group consisting of alkali metal hydroxides; alkaline earth metal hydroxides; alkali metal cyanides; alkaline earth metal cyanides; alkali metal phosphates; alkaline earth metal phosphates; alkali metal carbonates; alkaline earth metal carbonates; alkali metal silicates; alkaline earth metal silicates; alkali metal borates and alkaline earth metal borates at a reaction temperature in the range of from about 120° C. to about 200° C., for a reaction time in the range of from about 5 minutes to about 4 hours, under substantially anhydrous conditions.

2. A process according to claim 1 in which the reaction temperature is in the range of from about 135° C. to about 190° C., and the reaction time is from about 10 minutes to about 3 hours.

3. A process according to claim 1 in which the alkyl substituent, R, contains from about 9 to about 20 carbon atoms.

4. A process according to claim 1 in which said sultone is present in an excess of from about .5% to about 15% over the stoichiometric amount.

5. A process according to claim 1 in which the reaction is performed in the presence of a non-polar solvent.

6. A process according to claim 5 in which the non-polar solvent is mineral oil.

7. A process of converting a reaction product of sulfur trioxide and an alpha olefin containing from about 10 to about 26 carbon atoms to predominantly an alkene sulfonate detergent composition which comprises reacting (a) said reaction product consisting essentially of isomeric alkene sulfonic acids, gamma and delta sultones, and minor ammounts of disulfonates with (b) an anhydrous alkaline powder selected from the group consisting of alkali metal hydroxides; alkaline earth metal hydroxides; alkali metal cyanides; alkaline earth metal cyanides; alkali metal phosphates; alkaline earth metal phosphates; alkaline earth metal carbonates; alkali metal silicates; alkaline earth metal silicates; alkali metal borates and alkaline earth metal borates at reaction temperature in the range of from about 120° C. to about 200° C., for a reaction time in the range of from about 5 minutes to about 4 hours, under substantially anhydrous conditions and vigorous mixing.

8. A process according to claim 7 in which the anhydrous alkaline powder is trisodium phosphate.

References Cited

UNITED STATES PATENTS 3,255,240   6/1966   Wolfram et al.

FOREIGN PATENTS 1,064,169   4/1967   Great Britain.
1,218,434   6/1966   Germany.

DANIEL D. HORWITZ, Primary Examiner